INVENTORS
THEODORUS HEHENKAMP
LIEUWE BOONSTRA
BY
AGENT 3,328,721
CONTROLLED RECTIFIER INVERTER WITH DELAYED BUILDUP OF OUTPUT AMPLITUDE
Theodorus Hehenkamp and Lieuwe Boonstra, Emmasingel, Eindhoven, Netherlands, assignors to North American Philips Company, Inc., New York, N.Y., a corporation of Delaware
Filed Aug. 12, 1965, Ser. No. 479,167
Claims priority, application Netherlands, Aug. 13, 1964, 6,409,309
8 Claims. (Cl. 331—62)

The invention pertains in general to self-generating converters including at least one semi-conductor controlled rectifier.

A particular converter of this type includes an oscillator, at least one controlled rectifier and an output circuit coupled to a load; the output circuit is subcritically damped by the load. The converter serves to convert the output of a direct voltage source into an alternating voltage which is fed to the load; the latter has an impedance which decreases to a steady operating value with a predetermined time delay after the converter is switched on.

Devices of the above kind are disclosed, for example, in U.S. Patent 3,241,039, issued Mar. 15, 1966, and assigned to the assignee of the instant application. In the arrangement of the patent, the load consists substantially of fluorescent discharge tubes. Such fluorescent tubes have an impedance which decreases to a steady operating value when the device is switched on, the decrease occurring after a period of time. All gas- or vapor-filled discharge tubes exhibit this phenomenon, as well as all electron tubes with hot cathodes and all loads whose resistive component has a strongly negative temperature coefficient.

When a converter of the above kind is switched on, it is often substantially unloaded, or at least strongly underloaded, until the impedance of the load has decreased to its operating value, for example, until a gas tube is ignited. As a result, the output voltage rises very rapidly and reaches a value much higher than the value occurring during normal operation; this is also true of the voltage across the controlled rectifiers of the output stage. The result is that the controlled rectifiers of the output stage are often damaged or destroyed during the short period which elapses between switching on the converter and the instant at which the impedance of the load has decreased to its operating value.

It is a primary object of the invention to provide a converter of the above or a similar kind in which damage to circuit components due to overvoltages is substantially eliminated.

In accordance with one aspect of the invention, the frequency-determining network of the oscillator is constructed so that, when the converter is switched on, the operating frequency of the oscillator is first comparatively low and then increases to its operating value with a delay such that the concomitant increase in the amplitude of the alternating voltage to its operating value is delayed at least as much as the decrease of the load impedance.

In an embodiment of the device according to the invention, a temperature-dependent resistor in the frequency determining network of the oscillator is connected so that the operating frequency of the oscillator increases with the temperature of the said resistor. Either NTC or PTC resistors may be used as the temperature-dependent resistors, i.e. resistors having a strong negative or positive temperature coefficient respectively. According to a preferred embodiment, a PTC-resistor is used; this may take the form, for example, of the filament of an incandescent lamp.

In order that the invention may readily be carried into effect, it will now be described in greater detail, by way of example, with reference to the accompanying drawing, in which.

Figure 1:
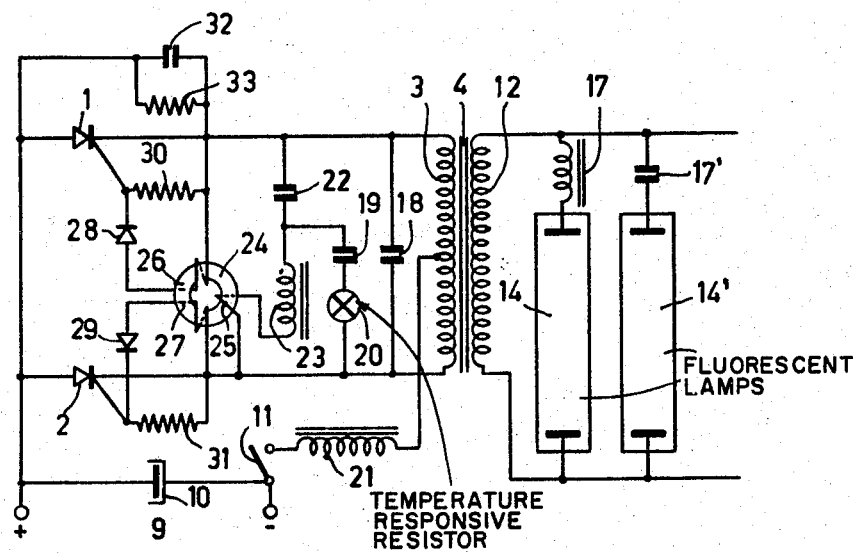
FIGURE 1 is the circuit diagram of a self-generating inverter including controlled semiconductor rectifiers according to the invention.

The device shown in FIGURE 1 is of the type described in the aforementioned patent. It comprises two controlled semiconductor rectifiers 1 and 2, for example, of the type BTX 17, the anodes of which are conected directly to the positive terminal of a direct voltage supply source 9 of, for example, 100 volts. The cathodes of the said rectifiers are connected to the respective ends of the primary 3, of, for example, 2×23 turns of a transformer 4 and the centre tapping of the said winding is connected to the negative terminal of the source 9 through an inductance 21 of, for example, 50 µh. and and an off-on switch 11. A capacitor 18 of, for example, 2 µf. is connected across the winding 3 and this parallel arrangement forms, together with the inductance 21, an oscillatory circuit with series resonance character. The capacitive reaction portion of the said circuit constituted by the elements 3 and 18 is coupled to a load circuit by means of a secondary winding 12 of, for example, 46 turns of the transformer 4. The said load circuit consists of the parallel combination of a number of fluorescent lamps 14, 14', for example, of the type TLS of 40 watt each in series with a control impedance 17, 17' of 17mh. and 40,000 pf. respectively. As a result of the said two different control impedances 17 and 17' the output load of the transformer 12 is substantially ohmic and the alternating currents through the lamps 14 and 14' are shifted in phase through approximately 90° with respect to one another which minimizes stroboscopic effect.

The controlled semiconductor rectifiers 1 and 2 are made periodically conducting alternately by pulses produced under the control of the current through a subcritically damped second oscillatory circuit connected across the winding 3 of the series resonant circuit 3, 18, 21. This second resonant circuit substantially consists of a capacitor 22 of, for example, 0.1 µf. and an inductance 23 of, for example 1.2 mh. connected in series therewith. It further comprises a winding 25 of, for example, 15 turns arranged on a saturatable core 24 of a ferromagnetic material, for example, an annular core of a ferrite, for example, ferroxcube. The winding 25 is connected in series with the capacitor 22 and the inductance 23. It forms the primary winding of low impedance of a non-linear control transformer which comprises the core 24 and two secondary windings 26 and 27 provided thereon of, for example, 20 turns each, each of which is coupled to the circuit between the cathode and control electrodes of one of the controlled rectifiers 1 and 2. Each of the said circuits comprises a resistor 30 and 31 respectively of, for example, 200 ohms which is connected to the secondary windings 26 and 27 respectively through a diode 28 and 29 respectively of, for example, the type OA 210 connected in the forward direction with respect to the current to the control electrode. The said diodes protect the controlled rectifiers 1 and 2 against reverse pulses by blocking them.

The direct voltage supply source 9 is shunted by an electrolytic capacitor 10 of, for example, 100/µf. and the anode-cathode circuit of the rectifier 1, is shunted by a capacitor 32 of, for example, 1 µf. connected in parallel with a discharge resistor 33 of, for example, 100KΩ.

When the switch 11 is closed, a current pulse passes through the capacitor 32 and the oscillatory circuit 18, 3, 21 and also through the series resonant circuit 22, 23, 25. Damped oscillations are set up by the pulse in the said circuit and, when the corresponding current through the winding 25 passes through zero for the first time, a sharp pulse is produced in the secondary windings 26 and 27 as a result of the core 24 flipping over from one magnetic polarization condition to the opposite magnetic polarization condition. The said pulse is blocked by one of the diodes 28 and 29 and passed by the other and ignites the corresponding rectifier 1 or 2, by the pulse applied to the control electrode thereof. The time during which the said rectifier, for example, the rectifier 1, remains conducting, is substantially equal to half a cycle of the natural frequency of the first oscillatory circuit 18, 3, 21, i.e. approximately 20 kc./s. After the said half cycle the current through the said circuit passes the zero value and the current through the rectifier 1 then becomes zero also so that the said controlled semiconductor rectifier extinguishes. The voltage drop produced across the capacitor 18 during the conducting period of the rectifier 1 again causes a current through the series resonant circuit 22, 23, 25. This current leads in phase with respect to the said voltage drop because the natural frequency of, for example, 6800 c./s. of the said circuit is lower than that of the circuit 18, 3, 21.

Substantially immediately after every passage through zero of the current through the capacitor 22, the inductance 23 and the winding 25, the core 24 suddenly flips over from one magnetic polarization condition to the opposite polarization or saturation condition and produces a current pulse through the winding 27 coupled to the control electrode of the other rectifier, for example, the rectifier 2, as a result of which the said rectifier is ignited. The foregoing is repeated for each cycle of operation.

During operation the switching frequency of the inverter is substantially equal to the natural frequency of the second oscillatory circuit 22, 23, 25. If the device were to operate immediately with the said switching frequency, the voltage across the winding 3 would rise to a comparatively high value before ignition of the fluorescent lamps 14, 14' takes place. According to the invention a temperature-dependent resistor is connected in the network 22, 23, 25 of the self-generating inverter which determines the switching frequency in a manner such that the operating frequency of the inverter increases with the temperature of the said resistor.

The said temperature-dependent resistor is an incandescent lamp, for example, of 50 watt at a voltage of 55 volt, and is connected in series with a capacitor 19 of, for example, 0.6 µf. across the series combination of the inductance 23 and of the winding 25.

When the device is switched on, the resistor 20 is negligibly small so that the switching frequency corresponds to the natural frequency of a second oscillatory circuit with an inductivity of somewhat more than 1.2 mh. and with a capacitance of 0.7 µf. (approximately 5500 c./s.). At this frequency the duration of every current pulse through one or through the other of the rectifiers 1 and 2, is only a small part (5.5/20=27.5%) of each half operating period so that the corresponding voltage across the winding 3 and/or across the secondary 12 of the transformer 4 initially is lower than its operating value. However, the temperature of the resistor 20 slowly increases as a result of the power dissipated therein, until its resistance reaches a value of, for example, approximately 40Ω with a dissipated power of approximately 12 watt. When the value of the resistor 20 increases, the effect of the capacitor 19 of the second oscillatory circuit 19, 20, 22, 23, 25 decreases. The result is that the current through the branch 22, 23 leads more strongly with respect to the voltage across the capacitor 18 and consequently the switching frequency of the device becomes higher until the said frequency ultimately reaches its operating value of approximately 6800 c./s. At this switching frequency the ratio between the conducting period determined by the first oscillatory circuit 18, 3, 21 and the operating period determined by the second oscillatory circuit 19, 20, 22, 23, 25 is increased to approximately 34% so that the voltages across the windings 3 and 12 also become larger. The thermal inertia of the resistor 20 is chosen to be so that, when the device is switched on, the rise of the generated alternating voltage to above its normal operating value is delayed at least as much as the decrease of the value of the load impedance by ignition of the fluorescent lamps 14 and 14'.

Figure 2:
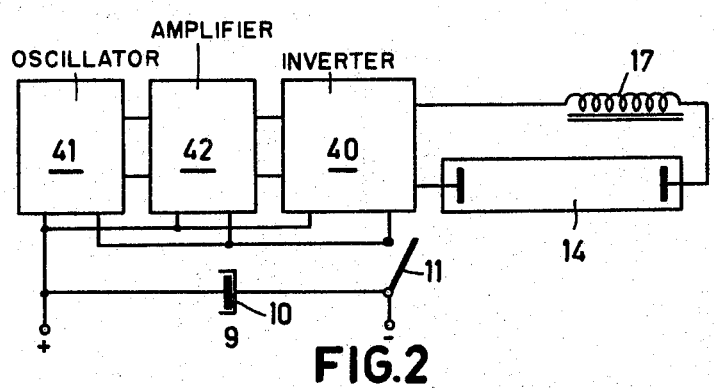
FIGURE 2 is the principal circuit diagram of an inverter including an output stage controlled by a self-generating oscillator and FIGURES 3, 4 and 5 are the circuit diagrams of three embodiments of the control oscillator of the said inverter.

The second embodiment shown in FIG. 2 in block-schematic form comprises an inverter 40 controlled by a separate control device to which is connected a load indicated in the form of a fluorescent lamp 14 in series with a control inductance 17. The control device comprises a control oscillator 41 and an intermediate amplifier 42 controlled by it which divides or multiplies the control frequency. The control oscillator 41, the intermediate amplifier 42, and the inverter output stage 40 are connected, through an off-on switch 11, to a direct voltage supply source 9 of, for example, 30 volt shunted by an electrolytic capacitor 10.

The output stage 40 is identical, for example, to the device shown in FIG. 1 with the difference that the elements 19, 20, 22 and 23 of the second oscillatory circuit are lacking, as is the starting device consisting of the elements 32 and 33, and that the primary 25 of the control transformer 24–27 is connected to the output terminals of the intermediate amplifier 42.

Figure 3:
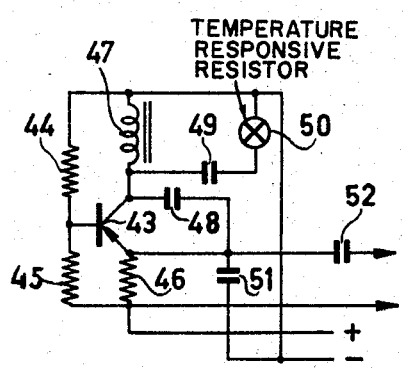

FIG. 3 shows an embodiment of the control oscillator 41. It comprises a transistor 43, for example, of the pnp-type OC 77, the emitter of which is connected to the positive supply terminal through a load resistor 46 of, for example 4.7KΩ. The base of the said transistor is connected to the tapping of an ohmic potentiometer consisting of the resistors 44 and 45 of, for example, 33KΩ and 10KΩ respectively, connected between the negative and the positive supply terminals and its collector is connected to the negative supply terminal through an inductance 47 of, for example, 100 mh. Two capacitors 48 and 51 of, for example, 0.25 and 2 µf. are arranged in series with one another across the inductance 47 and their common point is directly connected to the emitter of the transistor 43. Together with the inductance 47 the said capacitors constitute an oscillatory circuit with tapping and with which the transistor 43 is included in a three-point oscillator circuit.

A third capacitor 49, of for example, 2µf., in series with a temperature-dependent resistor 50 in the form of an incandescent lamp of, for example 8 volt and 1.8 watt, is connected in parallel with the inductance 47.

Finally the emitter of the transistor 42 is coupled to the input of the intermediate amplifier 42 by means of a capacitor 52 of, for example, 2µf.

When the device is switched on at which time resistor 50 is cold, the oscillator of FIG. 3 oscillates at the natural frequency of the oscillatory circuit 47, 48, 49, 51, for example, approximately 810 c./s. Resistor 50 is slowly heated by the circulation current through the circuit 49, 50 of the oscillatory circuit and the oscillation frequency increases to an operating value of, for example, approximately 1 kc./s. The intermediate amplifier 42 multiplies the said control frequency by a constant factor of eight so that the output stage is controlled initially with a switching frequency of 6500 c./s. and finally, after ignition of the lamp 14, with a frequency of 8000 c./s.

Figure 4:
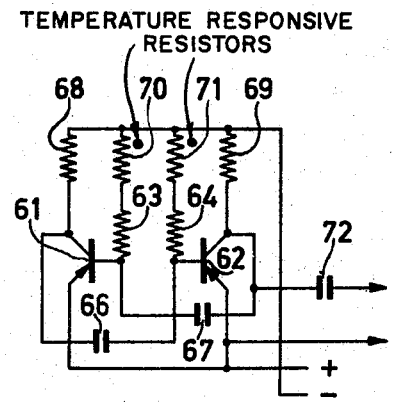

FIGURE 4 shows a second embodiment of the control oscillator 41. This embodiment is an astable trigger circuit with two transistors 61 and 62, for example of the pnp-type OC 16. The emitters of the said transistors are connected to the positive supply terminal, their collectors are connected to the negative supply terminals through load resistors 68 and 69 respectively of, for example, 300Ω each, and their base electrodes are connected to the same negative terminal, each through a resistor 63 and 64 respectively of 7KΩ in series with a temperature-dependent resistor 70 and 71 respectively. These resistors are so-called NTC-resistors having a strong negative temperature coefficient, for example, of the miniature type 83900/3K5 having a "cold" value of 3500Ω. The base and collector electrodes of the transistors 61 and 62 are coupled crosswise through capacitors 66 and 67 of, for example, 1500 pf. each and the collector of the transistor 62 is coupled to the input of the intermediate amplifier 42 through a capacitor 72 of, for example, 0.4μf.

When switching on the device the multivibrator of FIGURE 4 oscillates with a frequency of, for example, approximately 46,000 c./s. The intermediate amplifier 42 is constructed for dividing this frequency by a factor of eight, so that the output stage 40 of the device is controlled with a switching frequency of 5750 c./s. The NTC-resistors 70 and 71 are slowly heated by the discharge current of the capacitors 66 and 67 and their resistance value decreases, for example, to approximately 1400Ω so that the frequency of the sawtooth oscillations produced by the oscillator of FIGURE 4 increases to approximately 57,600 c./s. which corresponds to an operating frequency of the output stage 40 of 7200 c./s.

The oscillator 41 of FIGURE 2 may also be constructed so that it can directly control the output stage 40. For example, the oscillation frequency of the oscillator of FIGURE 4 could be reduced by a factor of eight by choosing capacitors 66 and 67 of eight times larger capacitance and its output could be connected directly or through an emitter follower stage to the winding 25 of the control transformer 24–27.

Figure 5:
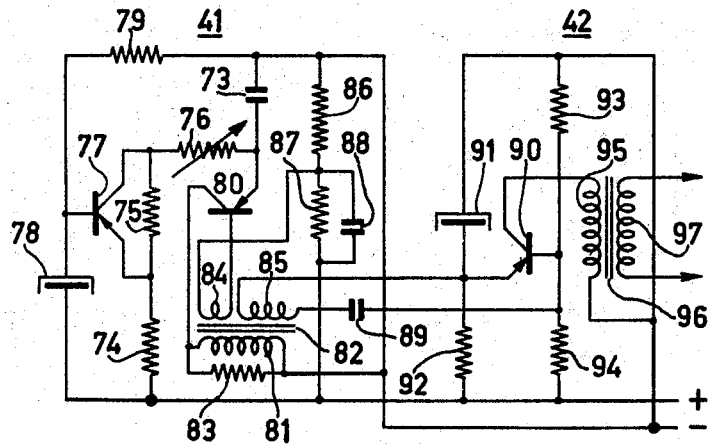

FIGURE 5 finally shows a third embodiment of the control oscillator 41 of FIGURE 2 and an associated intermediate amplifier 42. The control oscillator shown on the left-hand part of FIGURE 5 is a sawtooth oscillator with a capacitor 73 of, for example, 0.47μf. which is charged by the supply source 9, 10 of FIGURE 2 through resistors 74, 75 and 76 of, for example, 120Ω, 3.3KΩ and 1KΩ respectively and which is periodically discharged through the emitter-collector circuit of a transistor 80 when its chrage voltage exceeds the voltage across the top part 86 of a voltage divider 86, 87, 88 connected across the supply source and to which the base of the transistor 80 is connected.

The collector circuit of the transistor 80, for example, of the type ASY 77, comprises the primary 81 with, for example, 200 turns of a pulse transformer 82 and the said winding is shunted by a damping resistor 83 of, for example, 300Ω. Its base circuit comprises, in addition to the voltage divider with the resistors 86 and 87 of, for example, 10 and 4.7KΩ respectively and the decoupling capacitor 88 of, for example, 0.1μf., a feedback winding 84 with, for example, 16 turns. The transformer 82 is provided with a third winding 85 of, for example, 16 turns, also, across which the output voltage of the control oscillator is produced.

As soon as the transistor 80 is made conducting by the increase of its positive emitter potential, a forward voltage is induced across the feedback winding 84 by its collector current flowing through the winding 81. The said voltage makes the transistor 80 more strongly conducting and keeps it in a strongly conducting condition until the capacitor 73 has discharged substantially completely through its emitter-collector circuit.

The output voltage of the control oscillator 41 is supplied between the emitter and the base of a transistor 90, for example, also of the type ASY 77, through a coupling capacitor 89. The said transistor is the amplifier element of the intermediate amplifier 42. Its emitter is connected to the negative terminal of the supply source 9, 10 through a decoupling capacitor 91 of, for example, 100μf. and to the positive terminal of the said source through a stabilisation resistor 92 of, for example, 1KΩ. The base of the said transistor is connected to the function of resistors 93 and 94 of 100KΩ and 3.9KΩ respectively connected across the supply source and its collector is connected to the negative terminal of the said supply source through the primary winding 95 with, for example, 200 turns of a transformer 96 provided with a secondary or output winding 97 having, for example, 70 turns.

According to the invention, the frequency-determining network 73–76 of the control oscillator of FIGURE 5 is constructed so that, when the device is switched on, the operating frequency of the oscillator is comparatively low at first and then increases to its operating value with such a delay that the rise of the higher alternating voltage produced by the output stage 40 of the device of FIGURE 2 to its operating value is delayed at least as much as the decrease of the load impedance 14, 17 of the said device. This object is achieved by means of a third transistor 77, for example, also of the type ASY 77, the collector-emitter circuit of which is connected across the resistor 75 in a manner such that its emitter is always positive with respect to its collector. The base of the said transistor is connected to a capacitor 78 of, for example, 800μf., the other terminal of which is connected to the positive terminal of the supply source. When the device is switched on, capacitor 78 is charged by the voltage of the said source through a resistor 79 of, for example, 100KΩ.

When the device is switched on, the capacitor 78 is initially without charge and the transistor 77 is initially cut-off by the voltage drop across the resistor 74 because the time constant of the RC network 78, 79 is much larger than that of the RC network 73–76. Under this condition the frequency of the pulses produced by the control oscillator 41 is determined by the capacitance of the capacitor 73 and by the total resistance of, for example, 3.9KΩ, of the resistors 74, 75 and 76. Thereafter, the capacitor 78 is charged slowly so that after a given time interval the transistor 77 becomes conducting during the end of each charging period of the capacitor 73 and thus shortens the said charging period. As a result of the ever increasing forward voltage across the capacitor 78, the transistor 77 becomes conducting sooner and more strongly during each of the successive charge periods of the capacitor 73 until, for example, after approximately 2 seconds, it constantly substantially short-circuits the resistor 75.

It will be clear that the ratio between the initial frequency and the operating frequency of the control pulses can easily be adjusted by varying the ratio between the total resistance of the resistors 74, 75 and 76, and that of the resistors 74 and 76. With a given adjustment of the variable resistor 76, for example, an initial frequency of 2200 c./s. and an operating frequency of 6800 c./s. were obtained.

On the other hand, the delay with which the operating frequency of the oscillator 41 increases to its operating value, is determined by the time constant of the RC-network 78, 79 and may consequently be chosen arbitrarily and be adapted to the delay with which the impedance of the load 14, 17 decreases to its operating value after the device has been switched on.

It will be clear that numerous other circuit arrangements can be used to obtain an operating frequency of the device which increases with time and is comparatively low when switching on the device.

What is claimed is:

1. A converter comprising at least one semiconductor controlled rectifier, an oscillator and an output circuit coupled to a load circuit, said output circuit being subcriitcally damped by said load circuit, means for coupling said rectifier to a direct voltage source and for causing said rectifier to oscillate by becoming periodically conductive and nonconductive thereby changing the direct voltage of said source into an alternating voltage, a frequency-determining network coupled to said oscillator, said load having an impedance which decreases to a steady operating value after a predetermined time interval upon switching on of the converter, said alternating voltage having a frequency determined by said frequency-determining network and having an amplitude which decreases in value in response to departures of the frequency of said oscillator from a given nominal frequency value and having an amplitude which increases in value with increasing values of said load impedance, and means in said frequency-determining network for operating said oscillator at a frequency value departing from said nominal value during said time interval and for operating said oscillator at said nominal frequency value subsequent to said time interval.

2. A self-generating converter comprising: at least one semiconductor controlled rectifier having main current circuit electrodes and a control electrode, a direct current supply source having two terminals, the main current circuit electrodes being connected to the different terminals of said supply source, a first resonant circuit having series resonance characteristics, one of the main current circuit electrodes of the rectifier being connected to a corresponding terminal of said supply source through said first resonant circuit, the capacitive portion of said first resonant circuit being coupled with a load circuit, a subcritically damped second resonant circuit connected across the capacitive portion of said first resonant circuit, said second resonant circuit including at least one resistive component and a non-linear element having opposite polarization states, said non-linear element changing over from one polarization state to the opposite polarization state in response to the passage through zero of the current through or the voltage across one of the reactive elements of the second resonant circuit, said change-over producing a pulse, means for applying said pulse to said control electrode, the switching frequency of the converter thereby being substantially determined by the values of the reactive and resistive elements of the second circuit, and means in said second resonant circuit for increasing the switching frequency from a first comparatively low value upon switching on of the supply source to a steady operating value after a predetermined time interval.

3. A converter comprising at least one semiconductor controlled rectifier, an oscillator and an output circuit coupled to a load circuit, said output circuit being subcritically damped by said load circuit, means for coupling said rectifier to a direct voltage source and for causing said rectifier to oscillate by becoming periodically conductive and nonconductive thereby changing the direct voltage of said source into an alternating voltage, a frequency-determining network coupled to said oscillator, said load having an impedance which decreases to a steady operating value after a predetermined time interval upon switching on of the converter, said alternating voltage having a frequency determined by said frequency-determining network and having an amplitude which decreases in value in response to departures of the frequency of said oscillator from a given nominal frequency value and having an amplitude which increases in value with increasing values of said load impedance, and a temperature-dependent resistor in said frequency-determining network for operating said oscillator at a frequency value less than said nominal value during said time interval and for operating said oscillator at said nominal frequency value subsequent to said time interval.

4. A converter as set forth in claim 3, wherein said resistor has a positive temperature coefficient.

5. A converter comprising at least one semiconductor controlled rectifier, an oscillator and an output circuit coupled to a load circuit, said output circuit being subcritically damped by said load circuit, means for coupling said rectifier to a direct voltage source and for causing said rectifier to oscillate by becoming periodically conductive and nonconductive thereby changing the direct voltage of said source into an alternating voltage, a frequency-determining network coupled to said oscillator, said load having an impedance which decreases to a steady operating value after a predetermined time interval upon switching-on of the converter, said alternating voltage having a frequency determined by said frequency-determining network and having an amplitude which decreases in value in response to departures of the frequency of said oscillator from a given nominal frequency value and having an amplitude which increases in value with increasing values of said load impedance, and variable impedance means in said frequency-determining network for operating said oscillator at a frequency value departing from said nominal value during said time interval and for operating said oscillator at said nominal frequency value subsequent to said time interval, said variable impedance means comprising auxiliary amplifier means, an RC-network having a time constant which is greater than said time interval and means for rendering said amplifier means conductive in response to variations of the charge voltage of the capacitance of said network.

6. A converter as claimed in claim 5, wherein said auxiliary amplifier is a transistor and said variable impedance comprises a resistor shunted by the emitter-collector circuit of said transistor.

7. A converter as claimed in claim 5, wherein said RC-network is directly connected to the direct voltage source when the converter is switched-on.

8. A converter as claimed in claim 6, wherein said RC-network is directly connected to the direct voltage source when the converter is switched-on.

References Cited

UNITED STATES PATENTS 3,206,694   9/1965   Bates _____ 331—113 X
3,273,076   9/1965   Wilting _____ 331—113

ROY LAKE, *Primary Examiner.*

S. H. GRIMM, *Assistant Examiner.*